D. C. JACKSON.
ELECTRIC CONTROLLING SYSTEM.
APPLICATION FILED NOV. 2, 1907.
911,878.
Patented Feb. 9, 1909.
2 SHEETS—SHEET 2.
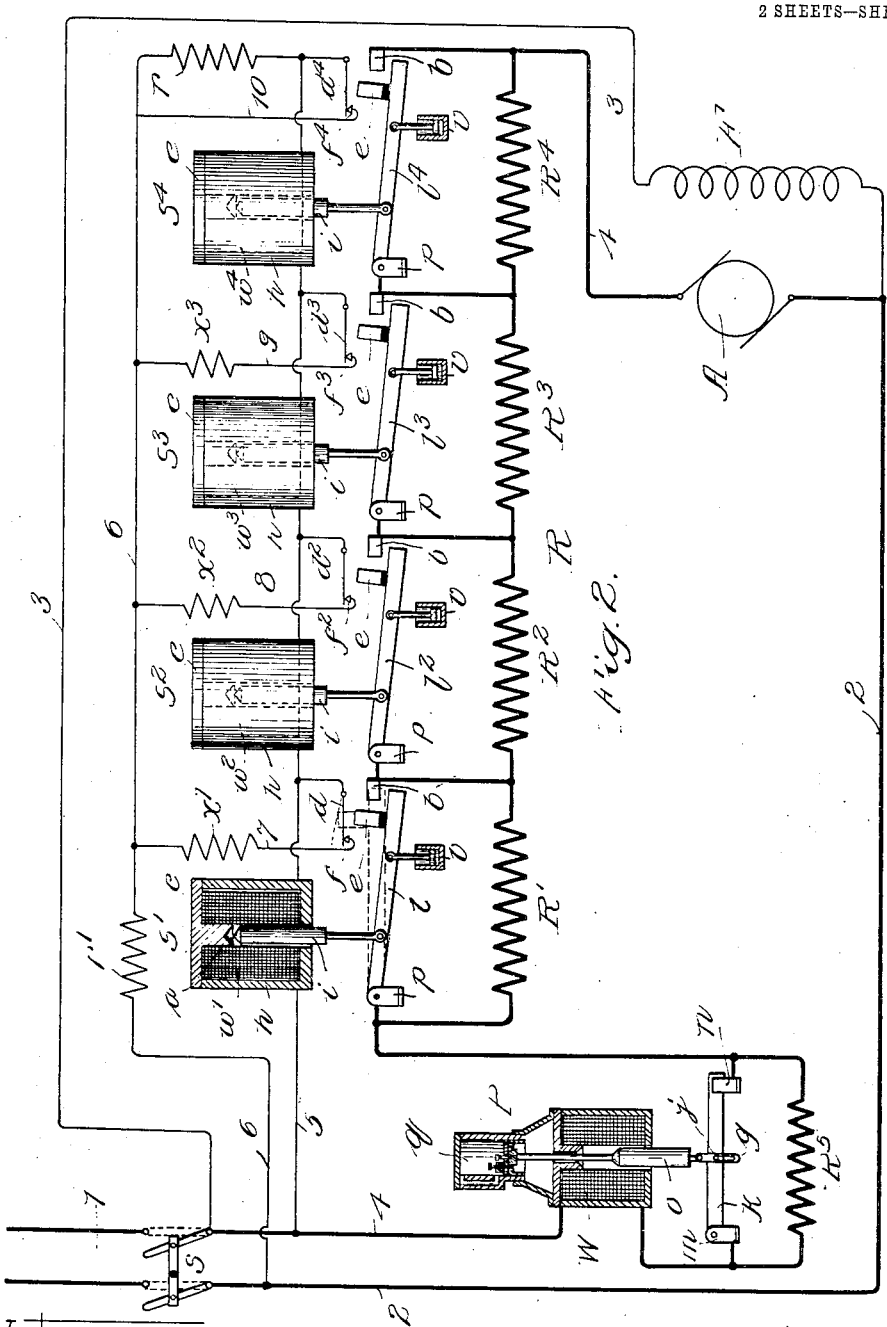
Witnesses
George E. Higham.
Leonard W. Novander.
Inventor
Dugald C. Jackson
By Brown & Williams
Attorneys

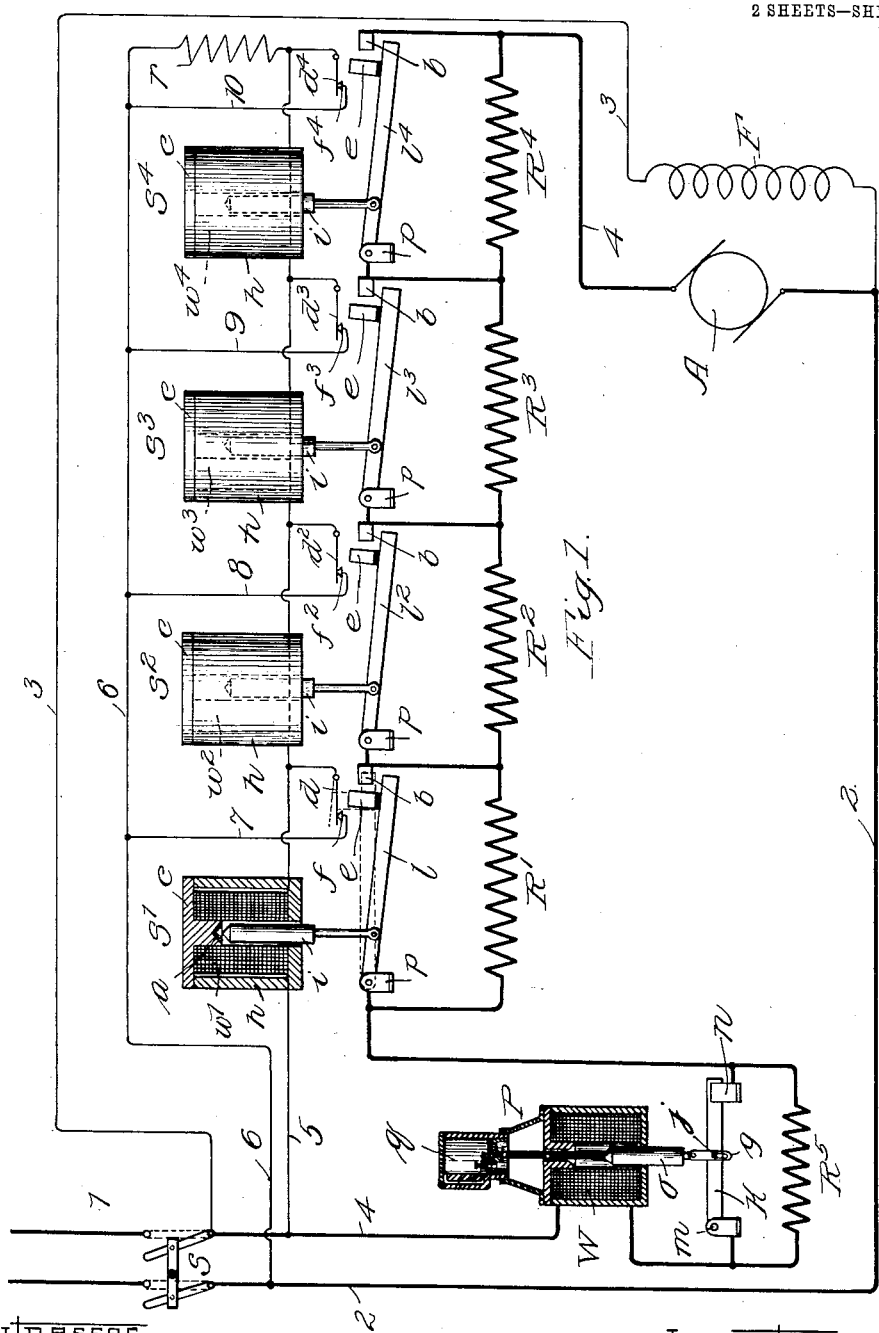

UNITED STATES PATENT OFFICE.

DUGALD C. JACKSON, OF BROOKLINE, MASSACHUSETTS.

ELECTRIC CONTROLLING SYSTEM.

No. 911,878.  Specification of Letters Patent.  Patented Feb. 9, 1909.

Application filed November 2, 1907. Serial No. 400,354.

*To all whom it may concern:*

Be it known that I, DUGALD C. JACKSON, citizen of the United States, residing at Brookline, in the county of Norfolk and State of Massachusetts, have invented a certain new and useful Improvement in Electric Controlling Systems, of which the following is a full, clear, concise, and exact description, reference being had to the accompanying drawings, forming a part of this specification.

My invention relates to the operation of electric motors and particularly to automatic starting mechanism and circuits therefor.

Electric motors are frequently controlled by electromagnetic switches associated with starting rheostats, and these switches have been arranged with more or less success in various associations with the main switch.

My present invention relates to that type of arrangements in which the starting rheostat is divided into various sections, each section being controlled by an electromagnetic switch so that the sections are successively rendered ineffective after the main switch has been closed, and it is particularly applicable to motors attached to constant potential circuits.

In my invention the electromagnets, which severally control the sections of the starting rheostat, are associated in series relation in a circuit in derivation with the main line, the arrangement being such that the electromagnets, with the exception of the first one, are prevented from effective connection in circuit until the first has performed its function of removing the corresponding rheostat section from the armature circuit, the switching mechanism of the first electromagnet serving at the same time to allow the second electromagnet to be connected effectively in circuit. Upon actuation of the second relay the second rheostat section is rendered ineffective and the third electromagnet effectively connected in circuit, and so on throughout all the electromagnets which may be of any number. After all the electromagnets have been actuated, all the resistance will have been rendered ineffective and the motor directly connected with the supply circuit. Resistances may also be associated in various arrangements in the electromagnet controlling circuits for adjusting the current and for economizing in current while the magnets are passively retaining their switching mechanisms in proper position.

My invention will be understood with reference to the accompanying drawing which illustrates the invention associated with a shunt wound electric motor connected with a constant potential electric circuit, in which—

Figure 1 shows the controlling apparatus and the various circuits therefor, and Fig. 2 shows a slightly modified arrangement thereof.

The main switch S serves when closed to connect the field F of the motor directly with the supply circuit 1 through the conductors 2 and 3, and to connect the armature A of the motor with the supply circuit through the conductors 2 and 4, the conductor 4 initially including the resistance sections $R'$, $R^2$, $R^3$, $R^4$, of the starting rheostat R, the resistance $R^5$ and the winding W. Associated with the resistance sections $R'$, $R^2$, $R^3$, $R^4$, respectively, are electromagnetic mechanisms $S'$, $S^2$, $S^3$, $S^4$, whose windings $w'$, $w^2$, $w^3$, $w^4$, are connected serially together and with the main line limbs through the conductors 5 and 6. The electromagnetic mechanisms may be made up in any desired manner, but, as illustrated, the winding thereof is surrounded by an iron shroud $h$, and a plunger or core $i$ is adapted for reciprocation within the winding. Each core also may have a cap $c$ having a conical recess $a$ into which the conical end of the core $i$ may pass upon attraction thereof, and when the core is in this position the magnets are capable of maintaining the switch mechanism in proper position with a much less current than was necessary to at first move the switch mechanism into the proper position. A switch lever $l$ is provided for each electromagnet and is pivoted at one end to a stationary pivot support $p$, while at an intermediary point the lever is pivoted to the core $i$ of the corresponding electromagnet. The free end of the lever is adapted for engagement with a contact surface $b$, while an insulated actuating extension $e$ is adapted when the core is attracted to move the contact arm or spring $d$ out of engagement with the contact point $f$.

The magnetic circuit for the winding W of the protective device may be the same as that for the other electromagnets, this circuit-protecting device being shown and described in my copending application, Serial No. 225,740 filed September 24, 1904, the lower end of the core being provided with the slotted link $g$ engaging the pin $j$ secured to the switch lever $k$ which is pivoted to the support $m$ and adapted for engagement with the contact surface $n$. Upon attraction of the core $o$ the switch arm $k$ will not be actuated until the lower end of the slotted link engages the pin $j$, the upper travel of the core being retarded by means of the dash pot mechanism $q$ until the pin $j$ is engaged by the link when the switch blade $k$ is quickly withdrawn from the contact surface $n$ and the short-circuiting about the resistance $R^5$ removed.

The pivoted end of the switch arm and the contact surface $b$ for each electromagnet are connected with the corresponding resistance section so that when the switch arm engages the contact surface $b$ this section will be short-circuited therethrough. Each of the contact surfaces $b$ is also connected with the pivoted end of the switch arm of the following electromagnet, and therefore when all the switch arms are attracted all the resistance sections will be short-circuited, and the motor connected directly with the supply circuit. The switch arm or spring $d$ associated with the electromagnet $S'$ is connected with the section of the conductor 5 between the electromagnets $S'$, and $S^2$ and normally engages its contact surface $f$ which is connected through conductor 7 with the conductor 6. The switch arm or spring $d^2$ associated with the electromagnet $S^2$ is connected with the section of the conductor 5 between the electromagnets $S^2$ and $S^3$ and normally engages its contact surface $f^2$ connected through the conductor 8 with the conductor 6. In the same manner the switch arms $d^3$ and $d^4$ are normally connected with the conductor 6. In other words, each switch arm $d$, $d^2$ and so on, normally closes a shunt path about the windings of the following electromagnets, which shunt paths are adjusted to normally prevent operation of the electromagnets with the exception of the first electromagnet $S'$.

The operation of the apparatus will now be apparent. Upon closure of the switch S, current is admitted directly to the field winding F through conductors 2 and 3 and current may flow through the armature circuit in which the resistance sections $R'$, $R^2$, $R^3$ and $R^4$ are all primarily included. At the same time, however, current flows through the circuit 5—6 which includes the electromagnets. As before stated, however, all the electromagnets, with the exception of $S'$, are normally rendered ineffective. Current, however, flows through the first electromagnet $S'$ through the following circuit from the main 4, through conductor 5, winding $w'$ of electromagnet $S'$, through switch arm $d$ to contact surface $f$, through conductor 7, and through conductor 6 to the main 2, and this electromagnet will be energized to move its switch blade $l$ into engagement with the contact surface $b$, thus causing the resistance section $R'$ to be shunted from circuit. At the same time, however, the extension $e$ of the switch blade disconnects the arm $d$ from the contact point $f$ thereby opening the shunt circuit about the second electromagnet $S^2$, which then is effectively connected serially in circuit with the electromagnet $S'$, and conductors 5 and 6, through the switch arm $d^2$, contact surface $f^2$ and conductor 8. The electromagnet $S^2$, therefore, becomes energized, and its switch blade $l^2$ will short-circuit the resistance section $R^2$ and will also disconnect switch arm $d^2$ from the contact surface $f^2$ to open the shunt circuit about the electromagnet $S^3$ which will then be effectively included serially in circuit with the electromagnets $S'$, and $S^2$ and with conductors 5 and 6 through the switch arm $d^3$, contact surface $f^3$ and conductor 9. As the electromagnet $S^4$ becomes energized the last section $R^4$ of the resistance will be short-circuited and the motor armature is then connected directly with the main circuit through the various electromagnet switch blades. These resistance sections may be adjusted so that when normally all included in circuit the motor will start very slowly, and any number of such sections and controlling electromagnetic mechanisms may be employed.

Electromagnetic mechanisms with this arrangement may be all exactly alike and by duly constructing the magnet windings so as to be of relatively high self inductance compared with their resistance, the action of the magnets may be retarded and thus starting of the motor may be caused to occupy a reasonable period of time. Other retarding means may be employed, however, such as small dash pots $v$ as shown in Fig. 2.

When this arrangement is connected with a motor, which must run for a considerable period, it becomes desirable to economize current by adding resistance to the magnet circuit, and resistance $r$ may be introduced into the electromagnet circuit at the instant when the last electromagnet switch is closed. The resistance should be connected with the conductors 5 and 6 beyond the last electromagnet $S^4$, and a switch arm $d^4$ and the conductor 10 should short-circuit this resistance until the switch blade $l^4$, upon energization of the electromagnet $S^4$, becomes actuated to open this short circuit to bring the resistance $r$ serially in circuit with the electromagnet windings. As before described, the electromagnetic mechanisms are constructed so that less current will be needed by them to hold their switch mechanisms in position after actuation thereof, than is required during the process of opening the switches, and the introduction of the resistance $r$, therefore, will be practical and economical in reducing the current flow after the electromagnets have performed their functions. As shown in Fig. 2, fixed resistance also, such as $r'$, may be introduced in either the conductor 5 or 6 in advance of the electromagnets, in which case the magnet windings may be made of much lower resistance and the uniformity of action improved. Also in order to equalize the action of the several magnets, resistances $x'$, $x^2$ and $x^3$ may be included in the conductors 7, 8 and 9 respectively of the shunt circuits. The various resistances in the derived circuit may be so adjusted that the current flow through each electromagnet may be the same. Many other arrangements of resistances might also be provided for modifying the operation of the devices depending upon the particular circumstances.

The electromagnetic protective device P serves to protect the various apparatus and circuits from undue current flow; the winding W being adjusted to cause effective actuation of the core $o$ only after a predetermined current maximum has flowed for a predetermined interval. Thus upon abnormal current flow through the motor circuit, the winding W will become energized and the core $o$ attracted, but will move only gradually owing to the dash pot mechanism $q$, and if this abnormal current flow is of sufficient length, the switch blade $k$ will be actuated to open the short circuit about the resistance $R^5$ and this resistance will be included in the motor circuit and the various apparatus will be protected; and when the current again falls to its normal value the resistance $R^5$ will be again removed from circuit.

I thus provide a system in which the controlling electromagnet mechanisms for the starting switches are all alike, which is a very desirable feature. The electromagnet circuit also is well protected against undue current flow after the electromagnets have performed their work of removing the motor rheostat from circuit. Upon proper adjustment of the resistances which are included in the shunt paths between the electromagnets the current in the derived circuit may be the same for each electromagnet, which insures regular and balanced operation thereof.

I do not wish to be limited to the exact arrangement of the apparatus and circuits herein shown as changes may readily be made without departing from the spirit of the invention.

I claim as new and desire to secure by Letters Patent:

In an electric motor controlling system, the combination with the motor of a rheostat resistance normally in circuit therewith, said resistance being divided into sections, a switch for closing each circuit about each section for said resistance, an electromagnet for controlling each switch, all of said magnets being connected in a circuit in derivation of the line mains, all of said electromagnets being connected in one side of said derived circuit, resistances connected in bridge of the derived circuit between each two of the electromagnets, a switch normally closing each of the bridging resistance circuits, means controlled by each electromagnet for opening the next succeeding bridging resistance circuit upon the energization of the electromagnet, the resistances of the bridging resistance circuits being graduated, the first bridging resistance being the highest and the last the lowest of the series.

In witness whereof, I hereunto subscribe my name this twenty-ninth day of October A. D., 1907.

DUGALD C. JACKSON.

Witnesses:
CATHARINE JACKSON,
MABEL F. JACKSON.